May 27, 1930.  W. H. KLOCKE  1,760,559

BEARING AND METHOD OF MAKING SAME

Filed Nov. 5, 1928

INVENTOR
William H. Klocke
BY
Fay, Oberlin & Fay
ATTORNEYS

Patented May 27, 1930

1,760,559

UNITED STATES PATENT OFFICE

WILLIAM H. KLOCKE, OF WOODHAVEN, NEW YORK, ASSIGNOR TO THE CLEVELAND GRAPHITE BRONZE COMPANY, OF CLEVELAND, OHIO, A CORPORATION OF OHIO

BEARING AND METHOD OF MAKING SAME

Application filed November 5, 1928. Serial No. 317,393.

The present invention, relating, as indicated, to a bearing and a method of making same is more particularly directed to the manufacture of lined semi-cylindrical bearings consisting of a semi-cylindrical sheet of a tough, strong supporting element, such as steel, provided on its inner surface with a lining of a suitable bearing metal, such as babbitt, integrally united thereto, and to the manufacture of this bearing from flat sheet stock to limits of great accuracy.

To the accomplishment of the foregoing and related ends, said invention, then, consists of the means hereinafter fully described and particularly pointed out in the claims; the annexed drawing and the following description setting forth in detail one method and one product exemplifying my invention, such disclosed procedure and product constituting, however, but one of various applications of the principle of my invention.

In said annexed drawing:—

Figure 1:
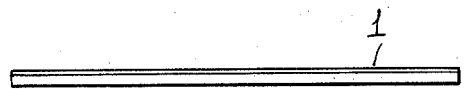
Figure 2:
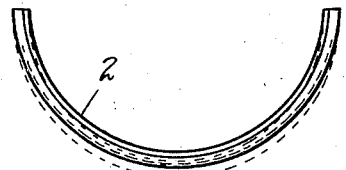
Figure 3:
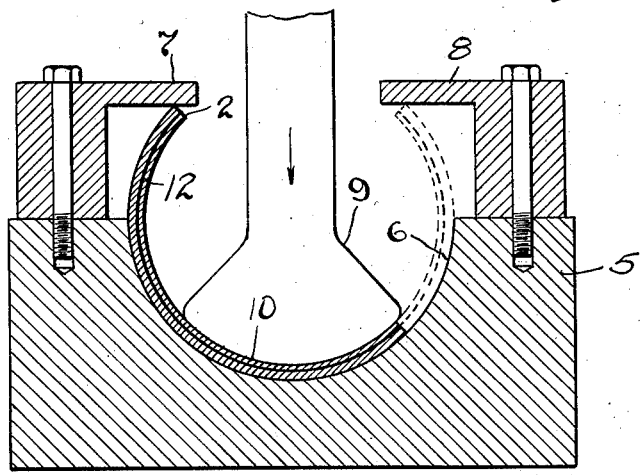
Figure 4:
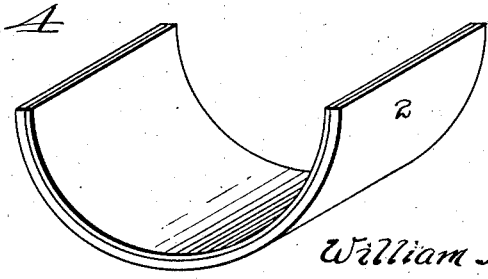

Fig. 1 is a side elevation of a blank from which my improved bearing is formed; Fig. 2 is a similar view of the blank after first being formed into semi-cylindrical shape; Fig. 3 is a side elevation partially in section showing the method of finishing or re-forming the semi-cylindrical bearing; and Fig. 4 is a side elevation of the finished bearing.

At present bearings for heavy service, such for instance as the crank shafts of internal combustion engines, are formed either of tubing, which is lined with a suitable bearing metal and then split and re-formed into two true accurate semi-cylindrical bearings, or they are formed by circling a strip of flat stock into a cylinder, lining this with bearing metal and then splitting the cylindrical shell and re-forming it with various other operations, such as boring, turning and the like, into true half cylindrical bearings.

The present invention is directed to the manufacture of these half bearings by initially forming a sheet of tough stock, such as steel, into a half cylinder. The blank 1 is rectangular in form and relatively uniform in thickness, as shown in Fig. 1, and is first formed into the inaccurate but approximately semi-cylindrical article 2 shown in Fig. 2. In the forming of a flat strip into the article of Fig. 2 it is almost impossible to form an accurate half cylinder, the metal ordinarily springing back a greater or less distance from the true cylindrical form which is indicated by the dotted line in this figure. It is impossible, so far as I know, to form accurately a half cylinder in a single pressing operation even though the metal be carried past the desired shape and then allowed to spring back into the exact form required, due to the irregularity in the stock from which the blanks are cut. No two blanks, even when given exactly the same deforming pressure, will spring back exactly the same amount, leaving the half cylinders of various shapes, and while the difference between these initially formed blanks is not great it is too great for accurate precision bearings, such as are required for automobile crank shafts, cam shafts and for similar purposes.

I have devised a new method of forming, or rather re-forming, the semi-cylindrical blanks, which consists, briefly stated, in re-striking each blank over a part of its length while allowing the balance of the blank to be free to draw into the part being operated upon. This operation is illustrated in Fig. 3, in which there is shown a die 5 provided with a semi-cylindrical recess 6 and with stop blocks 7 and 8 projecting above the die as guides for the ends of the blank 2, which is shown in Fig. 3 in position in the die ready for operation by the complementary striking die 9. The die 9 is provided with a circular striking face 10 extending circumferentially above a quarter of a circle. The blank 2 is positioned beneath the plunger 9 which operates in a direction indicated by the arrows 11 so that the one end of the blank is directly beneath one end of the striking surface 10 of the movable die. A half of the semi-cylindrical bearing is thus in position to be operated upon, the other half 12 extending around the side of the recess 6 and engaging against the stop block 7. The dies are now operated to deliver a heavy squeezing pressure on the lower portion of the blank, during which action the upper portion is free to move and to permit the engaged portion to adapt itself to the cooperating dies and to be given a true set therein. The die 9 is now raised and the blank is swung around until the end which has been struck engages against the stop block 8, after which the die 9 again descends, re-forming the other half of the blank, while the first half is free to move and flow into the space between the dies to effect a true cylindrical forming of the blank all over its surface.

After the blank is thus actually re-formed in semi-cylindrical shape it may be cut to length if this operation has not already been performed prior to the re-forming, and it is then lined in any suitable manner, machined inside and out, ground, and is then ready for use.

I have found the present method to give very much more accurate bearings than is possible where a re-forming operation is carried out between two cooperative semi-cylindrical dies in which the entire length of the half bearing is operated upon at the same time. By the former method it was impossible to secure uniformly accurate half cylinders regardless of the care exercised in the operation, and regardless of the accuracy with which the dies were made. With the present method approximately true, accurate half cylinders are formed and the articles thus produced are extremely uniform and very few have to be rejected because of any inaccuracy in the form.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making half bearings, the steps which consist in pressing a roughly semi-cylindrical blank between cooperative dies cooperating against not to exceed one-half of said blank while allowing the remainder thereof to be free to move under the action of the dies, and then operating upon the formerly free portion of said blank while allowing the previously formed portion to be free to move under the action of said die.

2. In a method of forming bearings, the steps which consist in forming a rectangular blank into approximately semi-cylindrical form, then re-forming said blank by successive squeezing operations carried on between dies operating first upon one circumferential portion of said semi-cylindrical blank and then upon the remainder.

3. In a method of forming bearings, the steps which consist in forming a blank of approximately semi-cylindrical form and then re-forming said blank by successive radial pressure application to various circumferential portions of said semi-cylindrical blank.

4. A curved bi-metal bearing having the entire surface thereof formed to an accurate predetermined contour by successive and individual swaging operations upon successive circumferential increments of its surface.

Signed by me, this 19th day of October, 1928.

WILLIAM H. KLOCKE.